July 22, 1969   KATSUZI SOEDA   3,457,486
SPEED-CONTROLLING DEVICE FOR D-C MOTORS
Filed Oct. 27, 1966   3 Sheets-Sheet 1

INVENTOR
KATSUZI SOEDA
BY
OSTROLENK, FABER, GERB & SOFFEN
ATTORNEYS

July 22, 1969  KATSUZI SOEDA  3,457,486
SPEED-CONTROLLING DEVICE FOR D-C MOTORS
Filed Oct. 27, 1966  3 Sheets-Sheet 2
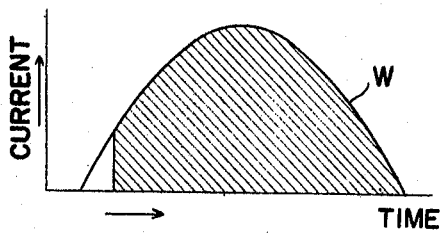
Fig. 4.
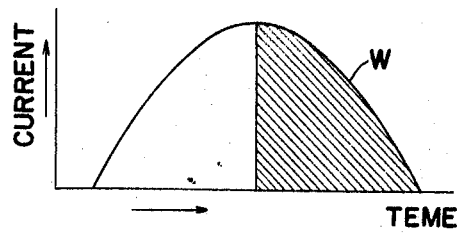
Fig. 5.
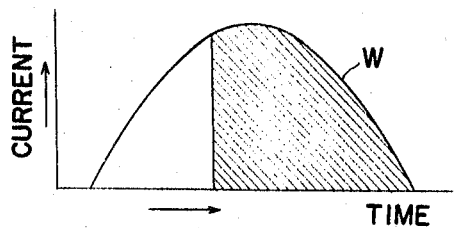
Fig. 6.
Fig. 7.
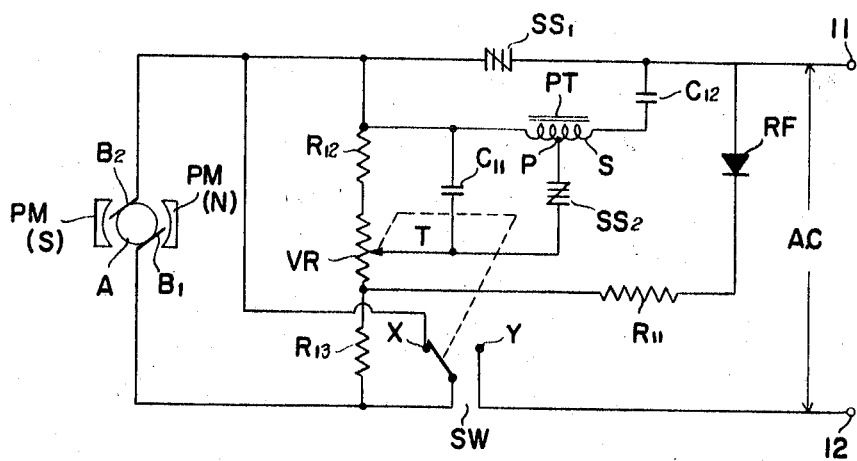
INVENTOR
KATSUZI SOEDA
BY
OSTROLENK, FABER, GERB & SOFFEN
ATTORNEYS

United States Patent Office 3,457,486
Patented July 22, 1969

3,457,486
SPEED-CONTROLLING DEVICE FOR D-C MOTORS
Katsuzi Soeda, Sukagawa-shi, Japan, assignor to Yamamoto Denki Kogyo Kabushiki Kaisha, Sukagawa-shi, Fukushima-ken, Japan
Filed Oct. 27, 1966, Ser. No. 589,903
Claims priority, application Japan, Jan. 31, 1966, 41/5,164; Feb. 19, 1966, 41/9,656
Int. Cl. H02p 5/12, 5/36, 7/24
U.S. Cl. 318—331   4 Claims

ABSTRACT OF THE DISCLOSURE

A motor controlled system is provided for a D.C. motor, in which the input energy from the source to the motor is operatively related to the magnitude of the input voltage and the counter-EMF of the motor. In the illustrated embodiments, the motor is energized through a circuit including a unidirectional switching means such as a silicon controlled rectifier. The firing angle of the unidirectional device is governed by a controlled signal voltage, which is energized by the same source, through a rectifying device, with the counter-EMF of the motor being added thereto in opposing relationship.

---

This invention relates to techniques for controlling the rotational speed of D-C electrical motors and more particularly to a new and improved device for controlling the speed of D-C motors whereby it is possible to operate a D-C motor by means of a single-phase A-C power source and accomplish control of the rotational speed of the motor in a smooth manner thereby to maintain the motor speed always at a constant value even with respect to fluctuations in the load thereon and accomplish stable operation of the motor.

It is an object of the present invention to improve control devices of electric motors, principally motors for use in sewing machines.

More specifically, an object of the invention is to provide a new control device by which the speed of a motor can be readily adjusted by adjusting a variable resistance, and which, moreover, is capable of causing the motor to operate at a constant speed irrespective of fluctuations in the load thereon such as, for example, load fluctuations arising from differences in the textures and thicknesses of the fabrics sewn in a sewing machine.

Another object of the invention is to provide a speed control device of the above stated character which is of simple and inexpensive composition and arrangement, preferably comprising electrical components such as a semiconductor controlled rectifier, switch element, rectifier, and resistance.

Still another object of the invention is to provide a speed control device of the above stated character which is of miniaturized form and can be installed in the space for mounting brushes within a motor.

According to the present invention this control of the rotational speed of the motor is accomplished by supplying electric current to a D-C motor from an A-C power source through a rectifier and controlling the transmission of electric power in response to the voltage difference between the rectified, positive half-way voltage and the counter electromotive force of the motor.

The nature, principle, and details of the invention will be more clearly apparent from the following detailed description with respect to preferred embodiments of the invention when read in conjunction with the accompanying drawings, in which like parts are designated by like reference characters and numerals.

In the drawings:

FIG. 1 is a circuit diagram showing one example of specific embodiment of the speed controlling device according to the invention;

FIGS. 2 through 6, inclusive, are graphical representations for explaining the speed controlling method according to the invention;

FIG. 7 is a circuit diagram showing another example of specific embodiment of the device of the invention;

Figure 1:
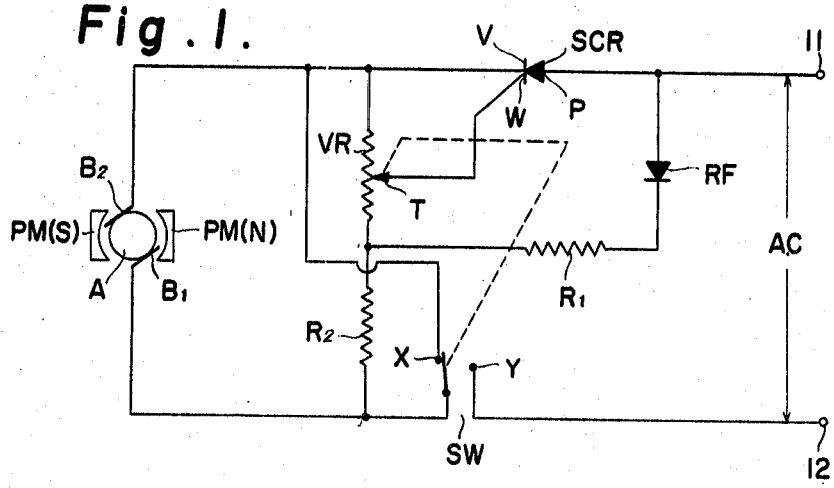

Referring first to FIG. 1 illustrating one example of practical embodiment of the invention, one terminal 11 of an A-C power source AC is connected by way of the anode terminal P and cathode terminal V of a silicon controlled rectifier SCR to a brush $B_2$ contacting the rotor A of a D-C motor, while the other terminal 12 of the A-C power source is connected by way of changeover switch SW, through one contact Y thereof, to an opposite brush $B_1$ contacting the rotor A. The field of the D-C motor is established by permanent magnets PM.

A variable resistance VR and a resistance $R_2$ are connected in series between brushes $B_2$ and $B_1$. One terminal 11 of the A-C power source, i.e., the terminal connected to the terminal P of the silicon controlled rectifier SCR, is further connected through a rectifier RF and a resistance $R_1$ to the junction between the above mentioned variable resistance VR and resistance $R_2$. The gate terminal W of the silicon controlled rectifier SCR is connected to the movable terminal T of the variable resistance VR.

One contact terminal Y of the changeover switch SW is connected to the terminal 12 of the A-C power source as mentioned hereinabove, and the other contact terminal X is connected to the brush $B_2$. The movable member of the switch SW and the movable terminal of the variable resistance are so intercoupled that when the variable resistance VR is in its still inoperative state, that is, when the motor is in its stopped state, the switch SW is closed on the X side as indicated in FIG. 1, and when the variable resistance VR begins to operate, the switch SW is simultaneously switched to the Y side which is thereby closed. The position at this time of the movable terminal T of the variable resistance VR is such that the resistance value introduced between the cathode terminal V and gate terminal W of the controlled rectifier SCR is a minimum.

By supplying A-C power from source AC to the input terminals 11 and 12 of the above described circuit device and operating the variable resistance VR, it is possible to adjust the rotational speed of the motor. Then, within the range of motor speeds adjustable by means of the variable resistance VR, it is possible to obtain substantially constant and stable rotation at any speed without its being affected by the magnitude of the load (within, of course, the limits of performance capacity of the motor). That is, it is possible to obtain speed constancy or constant-speed regulation.

The principle of the circuit of the invention will now be considered in two parts for the sake of convenience, the first part relating to the adjustment of rotational speed of the motor through variations caused by the operation of the variable resistance VR in the voltage and counter-electromotive force of the control circuit, and the second part relating to the constant-speed of the motor obtainable by means of the circuit device of the invention.

With respect to the first part relating to the principle of speed adjustment of the motor, if the resistance value of resistance $R_2$ in the circuit shown in FIG. 1 is selected to be substantially higher than that of the variable resistance VR, most of the rectified current flowing through the rectifier RF will flow through the side of the variable resistance VR, that is, the circuit comprising one power supply terminal 11—rectifier RF—resistance $R_1$—variable resistance VR—brush $B_2$—rotor A—brush $B_1$—switch SW—the other power supply terminal 12.

Figure 2:
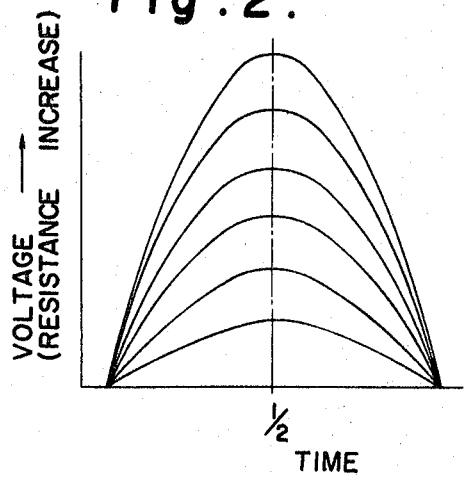

When the voltage which is applied between the cathode terminal V and gate terminal W of the controlled rectifier SCR in the above mentioned circuit is considered, it is apparent that this voltage is produced by the above mentioned rectified current in that resistance part of the variable resistance VR which is introduced between the cathode and gate of the rectifier SCR and that the magnitude of this voltage is caused to vary by a variation in the resistance value of the above mentioned resistance part, that is, by a movement of the movable terminal T of the variable resistance VR. This voltage variation is such that as the resistance value of the above mentioned resistance part increases, this voltage also increases proportionally thereto as indicated in FIG. 2.

All of the voltage produced in this manner is applied between the cathode and the gate only at the time the motor is started. After the motor once starts, the voltage applied between the cathode and gate, because of the generation of a voltage due to counter electromotive force, becomes a voltage equal to the difference between the voltage produced by the rectified current and the voltage of the counter-electromotive force (that is, more specifically, the divided voltage out of the total counter electromotive force of the motor existing between the movable terminal T and the fixed terminal of the variable resistance VR connected to the brush $B_2$ and cathode terminal V).

The voltage applied between the cathode and gate becomes a difference voltage since the current due to the counter electromotive force flows in a direction opposite to that of the aforementioned rectified current, that is, in the direction of: rotor A→brush $B_2$→variable resistance VR→resistance $R_2$→brush $B_1$, whereby the two currents act in an opposing manner.

On the basis of the above explanation, the operation of the circuit illustrated in FIG. 1 may be considered to take place in the following manner. When the operation of the variable resistance VR is started, a rectified current is caused to flow through the circuit comprising one power supply terminal 11—rectifier RF—resistance $R_1$—variable resistance VR—brush $B_2$—rotor A—brush $B_1$—switch SW—the other power supply terminal 12. This rectified current produces a voltage between the cathode and gate of the rectifier SCR. When this voltage reaches the value (trigger gate voltage) necessary for causing the controlled rectifier SCR to become conductive, the controlled rectifier SCR becomes conductive, and the main current for the motor flows through the circuit comprising: one power supply terminal 11—controlled rectifier SCR—brush $B_2$—rotor A—brush $B_1$—switch SW—the other power supply terminal 12, whereupon the motor is started.

This transition at the time of starting is the same at any operational position of the variable resistance VR (that is, provided that this operational position is such that the voltage produced thereby between the cathode and gate can reach the value of the trigger gate voltage), and the only difference due to the operation position is the difference in the time required for the voltage produced between the cathode and gate to reach the value of the trigger gate voltage.

The subsequent rotation of the motor started in the above described manner will now be considered. Since a counter electromotive force is produced in the motor once it starts, as mentioned hereinabove, the voltage applied between the cathode and gate of the controlled rectifier SCR becomes, also as mentioned hereinabove, the difference between the voltage due to the rectified current and the counter-electromotive force. Accordingly, the motor rotates at a speed such that the difference between the maximum value of the voltage obtainable at each position of the variable resistance VR, that is, the voltage at time $\frac{1}{2}\pi$ as indicated in FIG. 2, and the counter electromotive force becomes exactly equal to the trigger gate voltage of the controlled rectifier SCR.

Since, as is well known, the counter electromotive force is proportional to the rotational speed of the motor, if the voltage produced by the rectified current is high, the counter electromotive force, also, will be proportionally high, and the rotational speed of the motor will also become high. This means, therefore, that the rotational speed of the motor can be controllably adjusted by adjustably varying the position of the movable terminal of the variable resistance VR thereby to vary the voltage due to the rectified current.

Once the controlled rectifier SCR is rendered conductive by the application of the trigger gate voltage, this conductive state is sustained thereafter even when the voltage impressed on the controlled rectifier SCR becomes lower than the trigger gate voltage as long as it does not becomes zero. This conductive state is terminated when the voltage impressed on the controlled rectifier becomes zero, that is, when one half wave is completed, and the succeeding conductive period begins when this impressed voltage reaches the value of the trigger gate voltage. Thus, the conductive period of the controlled rectifier SCR ends after one half wave, and the conductive period occurs in the succeeding half wave when the impressed voltage reaches the value of the trigger gate voltage.

The use of a changeover type switch for the switch SW is for the purpose of applying instantaneous braking to the motor when it is being stopped. More specifically, when the operation of the variable resistance VR is terminated, that is, when the motor is placed in its stopping state, the moving contact of the switch SW returns to the side of contact X to open the circuit on the power supply side and to close the circuit of rotor A—brush $B_2$—switch SW—brush $B_1$. Thereupon, a short-circuit current within the field established by the permanent magnets PM flows through this circuit so closed, whereby the rotor A is subjected to instantaneous braking.

The resistance $R_1$ is a rectified voltage controlling resistance for the purpose of controlling the rectified voltage to be impressed on the variable resistance VR through the rectifier RF as a voltage of appropriate value. The resistance $R_2$ is a counter electromotive force controlling resistance for appropriately controlling and applying the counter-electromotive force to the variable resistance VR. Furthermore, the resistance $R_2$ is necessary also for causing most of the rectified current which has passed through the path of rectifier RF—resistance $R_1$ to flow through the side of variable resistance VR—brush $B_2$ as mentioned hereinbefore.

The aforementioned second part relating to the attainment of constant-speed regulation of the motor by means of the circuit device of the invention will now be described in detail.

First, the case when the voltage applied by operating the variable resistance VR between the cathode and gate of the controlled rectifier SCR in the circuit illustrated in FIG. 1 is relatively low, that is, at the time of low-speed rotation of the motor, will be considered. The waveform of the rectified voltage applied between the cathode and the gate in this case will have a relatively low maximum value, as indicated by any of the lower waveforms in FIG. 2. This waveform is shown in FIG. 3.

Figure 3:
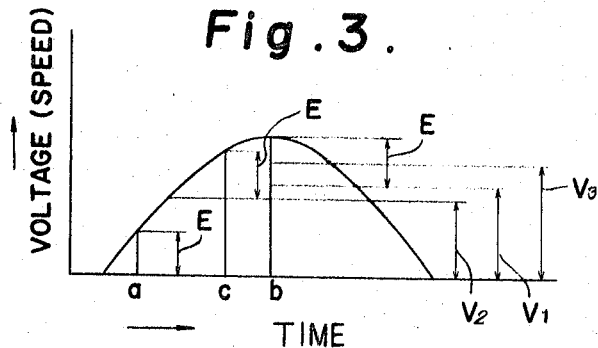

If it is assumed that the trigger gate voltage of the controlled rectifier SCR is of a magnitude as indicated by E in FIG. 3, the initial conductive point at the time of starting of the motor will be at the time $a$, and the electrical energy which flows through the motor at this time, i.e., the electrical energy transmitted, corresponds to the shaded portion of the waveform W of the current flowing through the motor as indicated in FIG. 4. However, once the motor starts, a counter electromotive force is produced in the motor as described hereinbefore, and the conductive point of the controlled rectifier SCR thereafter corresponds to the point at which the voltage difference resulting when the counter electromotive force is subtracted from the rectified voltage.

While the vertical axis of the waveform chart of FIG. 3 has been taken, for the purpose of illustration, as an axis representing voltage, since the rotational speed of the motor under consideration increases proportionally with the voltage, as is known, this axis may be considered to represent the rotational speed.

The case when the rotational speed of the motor is at the position of point $b$ in FIG. 3 will be considered, that is, when the counter electromotive force of the motor is the magnitude $V_1$. The quantity of electrical energy conducted to the motor at this time corresponds to the shaded portion of the waveform W shown in FIG. 5. If, in this case, the load condition changes, and the counter electromotive force decreases to the magnitude of $V_2$ indicated in FIG. 3, the conductive point in this case will shift from position $b$ to position $c$. The electrical energy conducted to the motor in this case where the conductive point shifts to position $c$ corresponds to the shaded portion of the waveform W shown in FIG. 6.

As a result of the change of the conductive point in this manner, the quantity of electrical energy applied to the motor in the case of a shift to point $c$ will increase relative to the case of point $b$, as is apparent from a comparison of FIGS. 5 and 6. An increase in the quantity of electrical energy applied to motor naturally causes an increase in the rotational speed of the motor, provided that there is no fluctuation in the load at that time, whereby the counter-electromotive force again becomes large, and the conductive point tends to return from point $c$ to point $b$.

In this manner, when the counter-electromotive force becomes low, that is, when the rotational speed of the motor drops, there is an immediate response for returning the rotational speed is always maintained at a constant value.

The case where the counter electromotive force is caused by a fluctuation in the load to exceed voltage $V_1$ and assume a value $V_3$ will now be considered. In this case, even at the point where the rectified voltage in the rectified voltage waveform shown in FIG. 3 vecomes a maximum, the difference between this voltage and the counter-electromotive force does not reach the value of the trigger gate voltage E. Consequently, the controlled rectifier SCR does not become conductive. In this case, therefore, since no current flows through the motor, the rotational speed of the motor progressively decreases, and at the point where the counter-electromotive force assumes the value $V_1$, the rectifier SCR begins conduction, whereby the rotational speed of the motor assumes a constant value as mentioned hereinabove.

This means that, even when the load fluctuates, the rotational speed of the motor can be sustained at a constant value by the automatic variations of the interruption and continuation of the current to the motor and the conductive point.

The above description of the speed control is fully applicable to the waveforms in all cases of the voltage applied between the cathode and gate of the rectifier SCR as it progressively increases up to its maximum value. Therefore, irrespective of the voltage applied between the cathode and gate, that is, irrespective of the operational position of the movable terminal of the variable resistance VR, the rotational speed of the motor can be maintained at a constant value conforming to the rectified voltage wavefore obtained by each operational position of the variable resistance VR regardless of the magnitude of the load imposed on the motor. Thus, the speed control device of the invention affords so-called speed constancy or constant-speed regulation in a D-C motor.

As is apparent from the foregoing description, as the magnitude of the rectified voltage applied between the cathode and gate of the rectifier SCR is varied by the operational variation of the variable resistance VR, at low values of this voltage, that is, at the beginning of operational variation of the variable resistance VR, the rotational speed of the motor is low. Then, as the operational variation of the variable resistance VR is continued, and this voltage is progressively increased, the motor speed also increases progressively.

Therefore, the motor speed can be adjusted as desired by adjusting the variable resistance VR. Furthermore, by setting the adjustment of the variable resistance VR at a certain point, the magnitude of the rectified voltage, i.e., the wavefore, at that point is determined, and, at a rotational speed such as to cause the difference of the rectified voltage conforming to this waveform and the counter-electromotive force to become equal to the trigger gate voltage, it is possible to obtain constant-speed regulation which is unaffected by the magnitude of the load (that is, within the limit of the motor capacity).

Furthermore, by the use of the speed-control device of this invention, since the full voltage of the power supply is always impressed on the motor, even at the time of its starting and at low speeds, irrespective of whether or not a load is being imposed on the motor or irrespective of the state of the load (of course, within the limit of the motor capacity), the motor characteristics at starting and a low speeds become excellent.

In order to indicate still more fully the nature and utility of the persent invention, further examples of embodiment of the invention are herebelow set forth, it being understood that these examples are presented as illustrative only and that they are not intended to limit the scope of the invention.

EXAMPLE 1

In another example of embodiment of the invention as illustrated in FIG. 7, silicon symmetrical switch elements are used in place of a silicon controlled rectifier.

Referring to FIG. 7 in the circuit shown therein, there are provided:

Silicon symmetrical switch elements $SS_1$ and $SS_2$;
Capacitors $C_{11}$ and $C_{12}$;
Resistances $R_{11}$, $R_{12}$, and $R_{13}$; and
A step-up transformer PT with a primary side terminal P, and a secondary side terminal S.

The other reference characters and the parts respectively designated thereby correspond to those of FIG. 1.

The breakdown peak voltage of the switch element $SS_1$ is selected to be from 2 to 2.5 times the effective value of the power source voltage, while that of the switch element $SS_2$ is selected to be 0.5 times the effective value of the power source voltage. Furthermore, the resistance value of resistance $R_{13}$ is selected to be substantially higher than the combined resistance of the variable resistance VR and the resistance $R_{12}$.

The speed-controlling device of the above described circuit composition and arrangement according to the present invention as illustrated in FIG. 7 operates in the following manner.

When the switch SW is closed, that is, switched to the side of contact Y, a current flows through the circuit of: one power supply terminal 11—rectifier RF—resistance $R_{11}$—variable resistance VR—resistance $R_{12}$—brush $B_2$—rotor A—brush $B_1$—switch SW—the other power supply terminal 12, and the capacitor $C_{11}$ is charged.

When the charging voltage applied to the capacitor $C_{11}$ exceeds the breakdown peak voltage of the switch element $SS_2$, this switch element $SS_2$ operates and assumes its conductive state, and resonance is caused by the capacitance of the capacitor $C_{11}$ and the inductance of the primary coil of the stepup transformer PT, whereby a damped oscillation pulse wave is generated. This pulse wave is stepped up a number of times by the secondary coil of the stepup transformer PT and, when it exceeds the breakdown peak voltage of the switch element $SS_1$, the switch element $SS_1$ becomes conductive state, and the motor starts. This conductive state terminates after one-half wave, and the above described operation is repeated by the succeeding rectified half wave.

In this example of the invention, also, it is possible to select the instant of transmission of power to the motor at any point in one half wave of the rectified voltage by adjusting the variable resistance VR. Furthermore, constant-speed regulation can be obtained through the difference between the counter electromotive force and the rectified power-supply voltage in the same manner as described hereinabove with reference to FIGS. 3 through 6, inclusive.

Since the switch element $SS_1$ is caused by the impressing of pulse waves to operate the respect to both positive and negative A-C waves, it should not have a rectifying effect under ordinary circumstances. However, since the impressed pulse wave is a pulse wave which is produced by a charge stored by a rectified current resulting from the halfwave rectification of an alternating current, that is, the current of only the positive wave of an alternating current, the switch element $SS_1$ rendered conductive by this pulse wave, in the case when the alternating current is impressed thereon, is affected by the pulse wave and is rendered conductive only during the effective period of the positive wave. Consequently, only the positive wave of the impressed alternating current flows through the switch element $SS_1$, and the negative wave does not flow therethrough.

EXAMPLE 2

Figure 8:
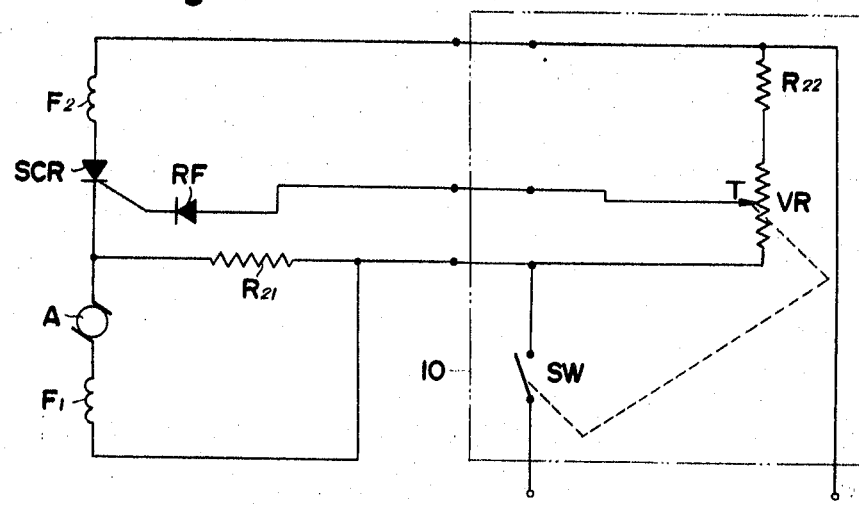
FIG. 8 is a circuit diagram showing one example of a speed controlling device of the invention whose essential parts are internally installed within a motor.
Figure 9:
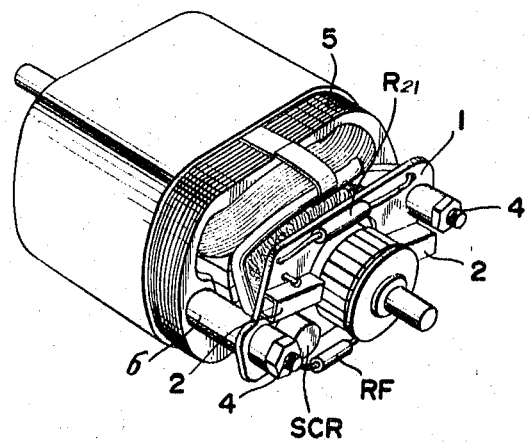
FIG. 9 is a partial perspective view, with a part removed, showing a motor in which some of the essential parts shown in FIG. 8 are internally installed.

An example of the invention in which a part of the device for controlling the speed of a D-C motor is installed within the motor is illustrated in FIGS. 8 and 9. In FIG. 8, reference characters $R_{21}$ and $R_{22}$ designate resistances, and $F_1$ and $F_2$ designate field coils. The other characters are the same as those shown in FIG. 1 and respectively designate similar parts.

The motor shown in the circuit diagram of FIG. 8 is a D-C motor in which the field coils are provided in series with the rotor. When the switch SW is closed, and the position of the movable terminal or sliding contact T of the variable resistance VR is suitably adjusted, the motor rotates at a desired speed and, moreover, exhibits speed constancy with respect to fluctuations in the load.

As is apparent from the foregoing description, this control is accomplished through the automatic variation in the conductive interval of the silicon controlled rectifier SCR or the conductive phase of the conducted positive half wave, since the control voltage applied between the gate and cathode of the silicon controlled rectifier SCR is equal to the voltage difference between the voltage introduced by the A-C power supply and the counter-electromotive force produced by the rotation of the motor.

The part of the circuit within the chain-line (dot-and-dash line) enclosure in FIG. 8 is the manually controlled part (i.e., a controller), and the silicon controlled rectifier SCR, rectifier RF, and the resistance $R_{21}$ are installed within the motor, for example, on the brush support plate 1 of the motor as illustrated in FIG. 9.

The brush support plate 1, which is mounted by screws and nuts 4 on support members 6 fixed to the field coil core 5 of the motor, has vacant spaces on both sides of the commutator 3 and brush holders 2. These spaces are utilized to install the controlled rectifier SCR, rectifier RF, and resistance $R_{21}$ in a suitable arrangement as illustrated in FIG. 9, for example, with the resistance $R_{21}$ mounted in the space on one side and the controlled rectifier SCR and rectifier RF mounted in the space on the other side. FIG. 9 illustrates an example of a D-C motor for a sewing machine, in the speed control circuit of which a silicon controlled rectifier is used for the controlled rectifier SCR, and a silicon diode is used for the rectifier RF.

The installation of the controlled rectifier and other components within the motor is highly advantageous in that these components are cooled by the motor fan, in that the construction of the aforementioned controller part is greatly simplified, and parts such as a base plate for mounting the controlled rectifier SCR become unnecessary. Accordingly, the production cost of the entire motor speed controlling device can be lowered.

It should be understood, of course, that the foregoing disclosure relates to only preferred embodiments of the invention and that is is intended to cover all changes and modifications of the examples of the invention herein chosen for the purposes of the disclosure, which do not constitute departure from the spirit and scope of the invention as set forth in the appended claims.

What is claimed is:

1. A motor control system for maintaining constant a preselected one of a plurality of D-C motor speeds over a range of motor load fluctuations, comprising:
    a D-C motor including first and second motor terminals;
    first and second input terminals for circuit connection to an A-C energization source;
    a motor energization circuit intermediate said motor terminals and input terminals;
    said motor energization circuit including a voltage dependent unidirectional switching means having a control signal means;
    said switching means having a conducting state, whereby substantially the entire input A-C voltage is impressed across said motor terminals, and a nonconducting state whereby energization current flow to said D-C motor through said motor energization circuit is substantially blocked;
    a control circuit for controlling the states of said switching means;
    said control circuit including a rectifier, a first current limiting resistor and a variable speed control resistor intermediate said input terminals and motor terminals, said rectifier connected between one of said input terminals and said variable resistor;
    the setting of said variable resistor establishing the desired constant operating speed of said D-C motor;
    said variable resistor including a variable output terminal, circuit connected to the control signal means of said switching means;
    said motor, when operating, applying a counter-electromotive force across said variable resistor, in opposition to the voltage drop due to the rectified current flow from said input terminals, such that the control signal applied to said switching means is operatively dependent on the difference between the A-C energization and counter-electromotive force amplitudes;
    said rectifier and unidirectional switching means circuit connected to said input terminals to permit current flow therethrough during the same alternate half-cycles;
    said control signal from said variable resistor controlling the portion of the half-cycle during which said unidirectional switching means is in its conducting state, to thereby provide input excitation to said D-C motor.

2. In a motor control system, as set forth in claim 1:
    said unidirectional switching means being a silicon-controlled rectifier having an anode, cathode and gate terminal;
    said control signal means being said gate terminal;
    said silicon controlled rectifier switching from its non-conducting state to its conducting state when the gate to cathode control signal from said variable resistor equals the predetermined trigger value, said silicon-controlled rectifier returning to its non-conducting state when the A-C source voltage completes its half wave;

said motor receiving energization during subsequent alternate half-cycles, such that the steady state motor speed corresponds to a condition whereby the difference between the maximum control voltage at the variable resistor and the counter electromotive force is equal to said trigger value.

3. In a motor control system, as set forth in claim 1:

said unidirectional switching means including first and second silicon switch elements;

means for causing said first silicon switch element to switch to its conducting state when the control signal voltage at said variable resistor reaches a switching magnitude;

said first silicon switch element, when conducting opening up a resonant circuit, to thereby establish a pulse wave;

said second silicon element included in a circuit inductively coupled to said resonant circuit;

said inductively coupled pulse wave switching said second switch element to its conducting state;

said second silicon switch element in series circuit along said motor energization circuit, such that it completes said energization circuit when switched to its conducting state;

said second silicon switch element switching from its nonconducting state to its conducting state when the pulse wave inductively coupled thereto exceeds its breakdown voltage, said second silicon switch element returning to its nonconducting state when the A-C source voltage completes its half wave;

said motor receiving energization during a portion of subsequent alternate half cycles, in accordance with the breakdown of said second silicon switch element.

4. A motor control system, as set forth in claim 1:

further including a changeover switch for disconnecting said D-C motor from said input terminals;

said changeover switch providing a path consisting of the D-C motor rotor and brushes, such that a short circuit current is established by the motor permanent magnets, within the motor field, to thereby provide substantially instantaneous braking.

References Cited

UNITED STATES PATENTS

| | | | |
|---|---|---|---|
| 3,222,583 | 12/1965 | Gutzwiller | 318—331 X |
| 3,225,232 | 12/1965 | Turley et al. | 318—331 X |
| 3,329,879 | 7/1967 | Wigington | 318—345 X |

ORIS L, RADER, Primary Examiner

E. SUTTON, Assistant Examiner

U.S. Cl. X.R.

318—345